United States Patent
Goevert et al.

(10) Patent No.: US 8,135,211 B2
(45) Date of Patent: Mar. 13, 2012

(54) METHOD AND DEVICE FOR THREE-DIMENSIONAL RECONSTRUCTION OF A SCENE

(75) Inventors: Tobias Goevert, Bielefeld (DE); Lars Krueger, Ulm (DE); Christian Woehler, Heroldstatt (DE)

(73) Assignee: Pilz GmbH & Co. KG, Ostfildern (DE)

( * ) Notice: Subject to any disclaimer, the term of this patent is extended or adjusted under 35 U.S.C. 154(b) by 760 days.

(21) Appl. No.: 12/233,757

(22) Filed: Sep. 19, 2008

(65) Prior Publication Data

US 2009/0129666 A1 May 21, 2009

Related U.S. Application Data

(63) Continuation of application No. PCT/EP2007/001271, filed on Feb. 14, 2007.

(30) Foreign Application Priority Data

Mar. 22, 2006 (DE) .......................... 10 2006 013 598

(51) Int. Cl.
*G06K 9/00* (2006.01)
(52) U.S. Cl. ..................... 382/154; 345/419; 345/427
(58) Field of Classification Search .................. None
See application file for complete search history.

(56) References Cited

U.S. PATENT DOCUMENTS

| | | | | |
|---|---|---|---|---|
| 5,390,291 | A * | 2/1995 | Ohashi .......................... | 345/419 |
| 5,710,875 | A * | 1/1998 | Harashima et al. ............ | 345/419 |
| 6,975,755 | B1 * | 12/2005 | Baumberg ..................... | 382/154 |
| 2002/0097241 | A1 * | 7/2002 | McCormack et al. ......... | 345/423 |
| 2004/0247176 | A1 * | 12/2004 | Aucsmith et al. ............. | 382/154 |
| 2005/0008220 | A1 | 1/2005 | Miyazaki | |
| 2009/0167844 | A1 | 7/2009 | Seki et al. | |

FOREIGN PATENT DOCUMENTS

| | | |
|---|---|---|
| JP | 05-52933 | 3/1993 |
| JP | 2002-56388 | 2/2002 |
| JP | 2004-234423 | 8/2004 |
| JP | 2006-54681 | 2/2006 |

OTHER PUBLICATIONS

Li Zhang, et al.; Spacetime Stereo: Shape Recovery for Dynamic Scenes; 2003; pp. 1-8.

(Continued)

*Primary Examiner* — Jason M Repko
*Assistant Examiner* — Siamak Harandi
(74) *Attorney, Agent, or Firm* — Harness, Dickey & Pierce, P.L.C.

(57) ABSTRACT

Passive methods for three-dimensional reconstruction of a scene by means of image data are generally based on the determination of spatial correspondences between a number of images of the scene recorded from various directions and distances. A method and a device are disclosed which provide a high reliability in the solution of the correspondence problem in conjunction with a low computational outlay. Image areas for determining the correspondences are determined within a plurality of images forming at least two image sequences. In preferred embodiments, a parameterized function h(u, v, t) is matched to each of the image areas in a space R(uvgt) defined by pixel position (u, v), image value g and time t. The parameters of the parameterized functions are used to form a similarity measure between the image areas.

17 Claims, 2 Drawing Sheets

OTHER PUBLICATIONS

James Davis, et al.; Spacetime Stereo: A Unifying Framework for Depth from Triangulation; Feb. 2005; pp. 296-302.

Ivan Laptev, et al.; Periodic Motion Detection and Segmentation via Approximate Sequence Alignment; 2005; 8 pages.

Umesh R. Dhond, et al.; Structure from Stereo—A Review; Nov. 1989; pp. 1489-1510.

Vishvjit S. Nalwa, et al.; On Detecting Edges; Nov. 1986; pp. 699-714.

Ernst Triendl, et al.; Stereo Vision and Navigation within Buildings; Mar. 31, 1987; pp. 1725-1730.

Ernst E. Triendl; How to Get the Edge Into the Map; 1978; pp. 946-950.

Fumiaki Yamana, et al.; Edge Plane Detection in Spatio-Temporal Images by Using Edge Vector and Edge Reliability; 2000; pp. 660-663.

Ivan Laptev, et al.; Space-time Interest Points; 2003; 8 pages.

Christian Woehler, et al.; A Contour Based Stereo Vision Algorithm for Video Surveilloance Applications; 2003; pp. 102-109.

Christian Woehler, et al.; Real-Time Object Recognition on Image Sequences with the Adaptable Time Delay Neural Network Algorithm—Applications for Autonomous Vehicles; 2001; pp. 593-618.

\* cited by examiner

METHOD AND DEVICE FOR THREE-DIMENSIONAL RECONSTRUCTION OF A SCENE

CROSS-REFERENCES TO RELATED APPLICATIONS

This application is a continuation of international patent application PCT/EP2007/001271, filed on Feb. 14, 2007 designating the U.S., which international patent application has been published in German language as WO 2007/107214 and claims priority from German patent application DE 10 2006 013 598.9 filed on Mar. 22, 2006. The entire contents of these prior applications are incorporated herein by reference.

BACKGROUND OF THE INVENTION

The invention relates to a method and a device for three-dimensional reconstruction of a scene, and more particularly to a method and a device for determining spatial correspondences between image areas in a number of images forming at least two image sequences of a scene that are recorded from different observation perspectives.

Passive methods for three-dimensional scene reconstruction by means of image data are generally based on the determination of spatial correspondences between a number of images of the scene recorded from various directions and distances. This determination of correspondences corresponds to an identification of pixel positions or pixel areas in the images with points or objects or object sections in the scene to be reconstructed. After the correspondences are determined, the three-dimensional structure of the scene is usually determined in the form of a point cloud by means of known methods, with each point or each point concentration of the point cloud corresponding to the mutually assigned and corresponding pixel positions or pixel areas, respectively.

The procedure for determining these spatial correspondences is usually termed as the correspondence problem in the literature, and various approaches for solving this problem have been proposed:

A customary method for determining the spatial correspondences is the correlation of the image contents on a local plane, wherein contents of spatial windows are mutually compared by applying suitable error measures as similarity measure such as, for example, cross correlation coefficients, sum of the squared differences, or sum of the absolute differences. This method is temporally effective, in particular for calibrated stereo image pairs, i.e. image pairs for which only pixels lying on common epipolar lines can be in correspondence.

In a publication of J. Davis, D. Nehab, R. Ramamoorthi, S. Rusinkiewicz "Spacetime Stereo: A unifying framework for Depth from Triangulation", IEEE Trans. Pattern Analysis and Machine Intelligence, Vol. 27, No. 2, 2005, it is proposed to use not only the contents of spatial windows for correlation analysis, but to extend the correlation window into the time dimension. The sum of the squared differences of the spatial temporal correlation windows is used as similarity measure for forming correspondence.

Another approach for solving the correspondence problem is described in a publication of C. Wöhler, L. Krüger "A Contour based Stereo Vision Algorithm for Video Surveillance Applications", SPIE Visual Communication and Image Processing, Lugano, 2003. In this approach, relevant image regions are determined in the images in a first step. Two-dimensional objects in the images are derived from the relevant image regions, and associated object contour lines are drawn. The correspondences are then determined by comparing the contour properties of the object contour lines at the intersection points with the epipolar lines.

SUMMARY OF THE INVENTION

It is an object of the present invention to provide a method and a device for solving the correspondence problem in three-dimensional scene reconstruction with high reliability.

It is another object to provide a method and a device for solving the correspondence problem in three-dimensional scene reconstruction with a low computational outlay.

According to one aspect of the invention, there is provided a method comprising the steps of providing at least one camera for recording a plurality of images of the scene including the object, recording a first sequence of first images of the scene from a first perspective relative to the scene, and recording a second sequence of second images of the scene from a second perspective relative to the scene, the first and second perspectives being different from one another, determining a plurality of first image areas within the first images and determining a plurality of second image areas within the second images, identifying a plurality of correspondences between the first and second image areas, and reconstructing the scene based on the correspondences between the first and second image areas, wherein the correspondences are identified by matching a parameterized function to each image area in order to obtain a plurality of first and second function parameters representing the first and second image areas, and by comparing respective first and second function parameters, and wherein the first and second sequences each comprise a plurality of first and second images so that a spatial position of the image areas and any movement over time of the image areas are used in order to identify the correspondences.

According to another aspect, there is provided a device for three-dimensional reconstruction of a scene comprising at least one object, the device comprising at least one camera for recording a plurality of images of the scene including a first sequence of first images of the scene from a first perspective relative to the scene, and a second sequence of second images of the scene from a second perspective relative to the scene, the first and second perspectives being different from one another, comprising at least one evaluation unit for determining correspondences between the first and second images, and comprising at least one calculating unit for reconstructing the object, wherein the evaluation unit is configured for determining a plurality of first image areas within the first images and for determining a plurality of second image areas within the second images, the evaluation unit further being configured for identifying the plurality of correspondences between the first and second image areas, and wherein the calculating unit is configured for reconstructing the scene based on the correspondences between the first and second image areas, wherein the correspondences are identified by matching a parameterized function to each image area in order to obtain a plurality of first and second function parameters representing the first and second image areas, and by comparing respective first and second function parameters, and wherein the first and second sequences each comprise a plurality of first and second images so that a spatial position of the image areas and any movement over time of the image areas are used in order to identify the correspondences.

The spatial correspondences represent assignments of image areas within the number of images of at least two image sequences, with an image area from a first image sequence being assigned to an image area from a second image sequence and, if appropriate, to further image areas from further image sequences. The term image area in this case includes extended areas in the image sequences, i.e. a plurality of pixels, and/or a single pixel.

Image sequences are recorded in order to implement the method, with an image sequence consisting of a succession of individual images of the scene, which images are recorded from an observation perspective and preferably have an equidistant temporal spacing. The image sequences are recorded from different observation perspectives, preferably from different observation directions and/or observation distances and/or using various optical imaging devices. Preferably, the images in the respective number of image sequences each are recorded at the same instants of time.

Relevant image regions, i.e. larger image regions suitable for determining correspondences are determined in the image sequences in embodiments of the invention. One or more image area(s) may be formed from these image regions, wherein the image area(s) may be identical to the image regions, and/or they may be subareas of the image regions, and/or they may be configured as areas overlapping with the image regions.

Each a parameterized function h(u, v, t) may be matched to the image areas in a space defined by pixel position u, v, image value g and time t in embodiments of the invention, i.e. a function that has as variable the pixel position u, v and the time t as variables and which has an arbitrary number of parameters. The terms space R(uvgt) and function h(u, v, t) are here representative of all mathematical representations that reflect the same technical content. In particular, these terms cover mathematically equivalent representations. For example, when processing color image the image value g has to be modified or adapted such that the space R is defined as a space R(uvrgbt) in the case of an RGB color model.

Parameters of the parameterized functions are used to form a similarity measure between image areas of the number of image sequences in embodiments of the invention. Parameters are to be understood, in particular, as the function parameters used in the selected mathematical representation of the function h(u, v, t), and/or parameters derived therefrom. Preferably, parameters of an image area in a first image sequence are brought into relationship with the parameters of an image area in a second image sequence and, if appropriate, with parameters of an image area in further image sequences; thus the parameters are mutually compared.

The new approach for addressing the correspondence problem is driven by the consideration that prior approaches for correspondence formation that are based on finding the similarity of small image regions tend to generate a plurality of erroneous correspondences, which then lead to 3D points with an erroneous spatial position. Such erroneous correspondences provoke strong interference, particularly in the case of moving objects in a scene, since they greatly complicate or render impossible a subsequent movement analysis, object segmentation or classification of the 3D point cloud. By contrast, in the case of the new method, apart from the spatial position of relevant image areas use is also made of their movement over time in order to form correspondence. In this way, it is possible to assign to one another as correspondences only similarly moving parts of the object, and so the number of the erroneous correspondences is greatly reduced.

In a preferred embodiment, the relevant image regions may have a variability in the image values exceeding a threshold sufficient for forming correspondence. The image values can be configured as pixel gray values, in particular. This ensures that no image regions with homogeneous image value distributions are used for forming correspondence.

The relevant image regions are preferably determined by means of an interest operator. A plurality of methods are known from digital image processing for this purpose; it is preferred to use edge filters and/or a local statistical gray value analysis as interest operator.

In a preferred embodiment, spatial temporal features are applied to determine the relevant image regions. The generation of spatial temporal features is described, by way of example, in C. Wöhler, J. K. Anlauf "Real-Time Object Recognition on Image Sequences with the Adaptable Time Delay Neural Network Algorithm—Applications for Autonomous Vehicles" in Image and Vision Computing, Vol. 19, No. 9-10, pp. 593-618, 2001, which is incorporated by reference. Here, spatial temporal features that are optimally suitable for classifying an object in image sequences are generated by a training method for the weights of the spatial temporal receptive fields of a neural network. Spatial temporal features can also be explicitly prescribed. It is thereby possible, for example, to achieve that a correspondence analysis is carried out only in those image areas wherein corners are located that move from top right to bottom left.

In a preferred embodiment, image areas are extracted from the image regions in the form of interest pixels. Such an extraction is performed by, for example, applying a non-maximum suppression and/or a skeletonizing operation or the like to the relevant image regions.

Such methods determine one or more edges or middle lines in a relevant image region on the basis of the gradient variation. The individual pixels of the edges or middle lines are used as interest pixels.

There is a particularly advantageous embodiment when the similarity measure is formed exclusively between image areas of the number of image sequences that are assigned to the same epipolars. This exploits the fact that use is frequently made of camera systems whose images can be described within the framework of epipolar geometry. In particular, the correspondence problem is reduced in this case to the need to assign to one another only image areas of one and the same epipolar. In the preferred case where interest pixels are used as image areas, similarity measures are formed only for interest pixels that lie on the same epipolars.

The matching of the parameterized function h(u, v, t) to each an interest pixel and the local environment thereof is advantageously performed in the space R(uvgt) such that a parameterized function is adapted for each interest pixel, taking account of its environment. The local environment preferably covers a pixel area with pixels that is directly adjacent to the respective interest pixel. This pixel area is preferably of square design, in particular with an odd number of pixels at the boundary edge. The local environment alternatively or in addition covers the temporal environment in the space R(uvgt), which extends over a suitably selected number of images of the image sequence. In this case, the number of images depends, for example, on the type and speed of objects to be detected.

In a simple embodiment, the parameterized function h(u, v, t) is designed as a hyperplane in the space R(uvgt), i.e. as an (n−1)-dimensional plane, as a subspace of the space R(uvgt). This design of the method requires a low computational outlay in adapting the parameterized function, and thereby minimizes the total computational outlay of the method.

By way of example, the angle between the normal vectors of the hyperplanes determined from the image areas is used as similarity measure for this embodiment. This difference angle is a measure of a similar variation in image value and/or gray value in the image areas of the various image sequences. Alternatively, or in addition, the difference of the axis section parameters in the intensity (g) dimension of the hyperplanes of image areas from the number of image sequences is used for the similarity measure. This difference is a measure of the absolute mean image value and/or gray value in the respective image area. The parameters of the function h can then be used, for example, in determining the optical flux.

In an advantageous way, the parameterized function h(u, v, t) is designed as a function of higher order than a hyperplane and/or as an arbitrary function, the parameterized function in particular forming an arbitrarily shaped surface in the space R(uvgt). Such a complex function certainly raises the computational outlay for the matching, but at the same time the accuracy of the matching is improved such that the image areas can be more reliably assigned.

It is preferred to make use as similarity measure of the differential volume between the surfaces determined from the image areas and/or of the volume, surrounded in a prescribed area of the surfaces, in the R(uvgt) space in the local environment of the pixel observed.

Alternatively, a direct comparison of the parameters of the parameterized functions determined from the image areas can be used as similarity measure. The distance in the parameter space is preferably used to this end. The parameter space is in this case an n-dimensional space, n specifying the number of independent parameters of the parameterized function h(u, v, t). It is preferred to use a Euclidian parameter space.

In order to minimize the computational outlay, it is envisaged that differential images are formed in order to ascertain the relevant image regions, specifically between images of the image sequences and of previously recorded reference images of the scene. Thus, instead of the current image, it is the absolute difference between the current image and a reference image of the scene that is used. In particular, this method variant is used when the image sequences are recorded by means of stationary cameras, i.e. cameras that do not move over time. A possible criterion for the interest operator is in this case a rise from 0 to 1 or a drop from 1 to 0 in a difference image binarized by means of a fixed threshold value. The number of erroneous correspondences can be greatly diminished in this way. It is also possible to use image pyramids or time pyramids in order to reduce the computational outlay, use firstly being made, instead of the current image, of an image with low resolution in order, for example, to be able to detect fast movements.

The new device comprises a camera system and at least one evaluation unit that is connected to the camera system. It is preferable that the camera system is designed as a stereo camera system that comprises two cameras. In particular, the two cameras may be arranged with a parallel observation direction, and/or are of identical design. This embodiment permits a very simple determination of the epipolar line.

The camera system may generally be designed as a calibrated multicamera system, i.e. it has two or more cameras. In particular, the cameras may have an overlapping observation area. It is preferred for the camera system to be calibrated, while it is also possible as an alternative to provide automatic calibration.

In a refinement, a second evaluation unit is used, which carries out a determination of correspondence for a three-dimensional scene reconstruction on the basis of a different algorithm, in particular on the basis of a correlation analysis. A further camera system is optionally provided for the second evaluation unit. This embodiment is based on the consideration of observing the same scene with two mutually independent device assemblies, and of reconstructing it, in order to ensure an increased detection reliability in the case of safety-relevant applications.

BRIEF DESCRIPTION OF THE DRAWINGS

Further details, features, feature combinations, advantages and effects based on the invention emerge from the following description of preferred exemplary embodiments of the invention and from the drawings, in which.

DESCRIPTION OF PREFERRED EMBODIMENTS

Figure 1:
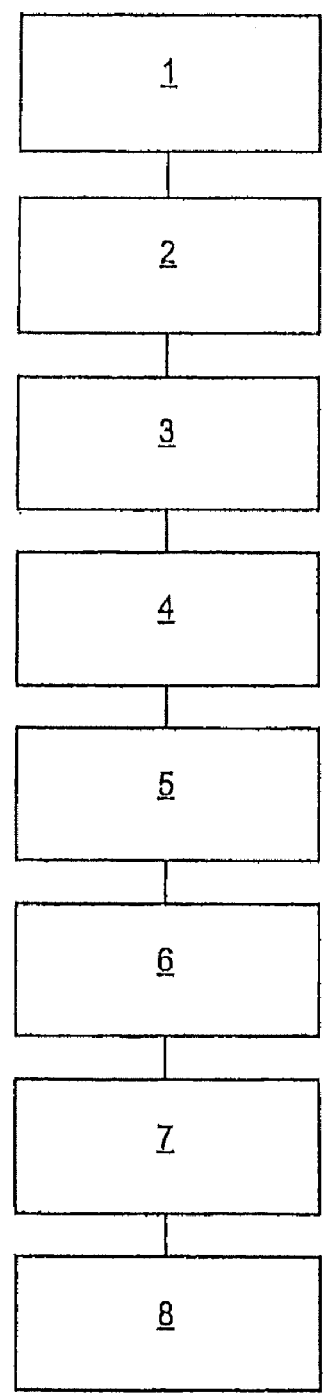
FIG. 1 shows a flowchart representing an exemplary embodiment of the new approach.

FIG. 1 shows a flowchart of an exemplary embodiment. In a step 1, image sequences are recorded by at least two cameras, the image sequences consisting of temporally equidistant individual images. The cameras are synchronized with one another such that an image is recorded simultaneously with each camera at the equidistant instants of time. A b-tuple of individual images is generated in this manner at each temporally equidistant instant, with b denoting the number of the at least two cameras.

In an optional step 2, difference images are generated by respectively subtracting reference images from the image values, in particular from the gray values, of the individual images of the image sequences.

If the at least two cameras are not arranged relative to one another in such a way that the epipolar condition is met, the individual images of the b-tuple are rectified in relation to one another in a step 3. This is done in a known way by applying rotation and translation matrices. After step 3, the individual images of the b-tuple are modified such that corresponding image areas are assigned to a common epipolar line. This step 3 can also be performed before step 2 or at a later instant.

In a step 4, relevant image regions are determined by means of an interest operator. For this purpose, the difference images are binarized, pixels of image regions with image values below a defined threshold value being given the value 0, and image regions above the threshold value being given the value 1. The image regions with pixel values 1 are denoted below as relevant image regions.

In a step 5, there are applied to the relevant image regions of the difference images (not of the binarized images) image processing methods that extract pixels having an environment with particularly strong gradients. Such pixels are particularly suitable for determining spatial correspondences. For example, there is applied to the relevant image regions a skeletonizing operation that generates skeleton-like middle lines in the relevant image regions. The extracted pixels, i.e. the pixels of the middle lines in this example, are termed interest pixels further below.

In a step 6, a parameterized function h(u, v, t) is adapted to each individual interest pixel and the local environment thereof, preferably on the basis of the original image and/or of the difference image. The interest pixels are in this case represented in a four-dimensional space R(uvgt) that is defined by the pixel position u, v, the image value or gray value g, and the time t. The parameterized function h(u, v, t) is designed in the simplest case as a hyperplane. This parameterized function h(u, v, t) is matched to an interest pixel and the environment thereof by using information relating to the image value or gray value distribution and the temporal behavior thereof. The local environment of the interest pixel covers the environment with reference to the pixel position u, v and the environment with reference to the time t.

The local pixel environment and/or the temporal environment of the recorded individual images are/is preferably selected in a fashion specific to the application. However, it is also possible to select the pixel environment and/or the temporal environment in an object-specific fashion by means of the object size. In the case of an immobile camera system, the extraction of the interest pixels preferably takes place in a difference image that is calculated by forming the difference from the current image of the scene and a reference image. It may be assumed without limitation of generality that the camera system consists of two identical cameras having parallel optical axes such that the epipolar lines correspond to the image lines.

In practice, there are many interest pixels at boundaries of objects in the image that have moved in comparison to the reference image into the scene or moved out of it. Ideally, it is possible for such an object boundary to be described by an abrupt discontinuity in the pixel intensity. In real images, however, such intensity discontinuities are often not observed, since they are "softened" by the point spread function of the optical system. For this reason, it is advantageous to describe the intensity variation at the object boundary by a sigmoid function such as, for example, the hyperbolic tangent. However, since it must be assumed that the sigmoid intensity variation is overlaid by further fluctuations in the pixel intensity, the intensity distribution in the spatial temporal environment of an interest pixel is preferably modeled as a mixed polynomial sigmoid formulation:

$$h(u,v,t)=p_1(v,t)\tan h[p_2(v,t)u+p_3(v,t)]+p_4(u,v,t). \quad (1)$$

The terms $p_1(v,t)$, $p_2(v,t)$ and $p_3(v,t)$ describe polynomials in v and t, while $p_4(u, v, t)$ is a polynomial in u, v and t. For a specific time step t, Equ. (1) essentially models vertically varying object boundaries, since owing to the aperture problem it is impossible to determine disparities based on horizontal edge profiles. The polynomial $p_1(v,t)$ describes the amplitude and $P_2(v,t)$ describes the steepness of the sigmoid function, which both depend on the image line v, while $p_3(v,t)$ reproduces the line-dependent position of the modeled object boundary. The value of $p_2(v,t)$ depends substantially on how sharply the edge is imaged by the optical system, large values describing a sharp edge, and small values describing an unsharp one. The polynomial $p_4(u, v, t)$ is a spatially variable offset term that models local intensity fluctuations inside and outside the object, and can thus take account of a disturbed background, for example. All the described properties are considered to be temporally variable in the context of the space time stereo approach, and this is reflected in the direct time dependence of the polynomials. Interest pixels for which the residue of the fit of the function h(u, v, t) to the pixel intensities g(u, v, t) is greater than a prescribed threshold value are rejected.

In its general form, Equ. (1) leads to a determination of the parameters of the function h(u, v, t) for each interest pixel by a nonlinear optimization method. Such optimization methods frequently require prior knowledge of the solution; it is not certain that the global optimum will actually be found, and they require long computing times in general. In particular, the last-named problem renders it difficult to use the method based on nonlinear optimization in realtime-capable systems, or disables it there.

For this reason, it is particularly advantageous when, in order to determine the parameters of the function h(u, v, t) for each interest pixel, use is made of a special computation path that is based on physically motivated simplifying assumptions and leads to a determination of the function parameters by linear optimization. Such an optimization problem is described in detail below, and can be solved very efficiently in computational terms by using methods known from the literature (for example by means of: W. H. Press, S. A. Teukolsky, W. T. Vetterling, B. P. Flannery "Numerical Recipes" in C. Cambridge University Press, Cambridge, UK, 1992, which is incorporated by reference).

The advantageous method is based on the following assumptions:

1. The offset $p_4(u, v, t)$ is spatially constant and corresponds to the pixel intensity $\bar{I}_{uv}(t)$ of the local environment of the interest pixel, averaged over the spatial image coordinates u and v.

2. The amplitude $p_1(v,t)$ of the sigmoid is spatially constant and proportional to the standard deviation $\sigma_1(t)$ of the pixel intensities in the spatial local environment of the interest pixel with $p_1(v,t)=k\sigma_1(t)$, k representing a constant factor prescribed by the user. The value of k preferably lies between 0.8 and 3. It is also possible here to use spatial temporal mean values and standard deviations instead of spatial mean values and standard deviations.

Using these assumptions, Equ. (1) can be rewritten as $$p_2(v, t)u + p_3(v, t) = \operatorname{arctanh}\left[\frac{I(u, v, t) - \bar{I}_{uv}(t)}{k\sigma_1(t)}\right] \equiv \tilde{I}(u, v, t). \quad (2)$$

The left-hand side of Equ. (2) is a polynomial in v and t whose parameters can be determined from the transformed image data $\tilde{I}(u, v, t)$ by solving a system of linear equations, efficient methods being available for solving them.

The Gaussian elimination method may be mentioned here by way of example. Pixels with $$|[I(u,v,t)-\bar{I}_{uv}(t)]/(k\sigma_1(t))|\geq\Theta$$

where $\Theta$ is a system parameter to be prescribed by the user, are not included in the optimization procedure, because a transformed pixel value $\tilde{I}(u, v, t)$ cannot be determined for them by inverting the sigmoid function, or can be determined only very inaccurately because of the large gradient of the arctan function. The value of $\Theta$ is preferably greater than 0.75, and must always be less than 1. In the context of the formulations described as a basis with the inventive method, the polynomial parameters on the left-hand side of Equ. (2) enable the determination of correspondences between stereo image pairs and/or pairs of stereo image sequences.

A further advantageous refinement of the method results when further simplifying assumptions are made:

3. The steepness $p_2(v,t)$ of the sigmoid is constant, with $p_2(v,t)=a$.

4. The object boundary can be represented by a straight line piece of the gradient b that moves at the constant speed c; this corresponds to $$p_3(v,t)=bv+ct+d.$$

These assumptions lead directly to a linear formulation for the four model parameters a, b, c and d:

$$au+bv+ct+d=\tilde{I}(u,v,t) \quad (3)$$

In this model, the movement behavior of the edge is described by the speed parameter c. In the context of the inventive method, the model parameters a, b, c and d enable the determination of correspondences between stereo image pairs and/or pairs of stereo image sequences.

Equ. (1) permits a direct sub-pixel accurate determination of the edge position $u_e$ from the fitted model parameters. This value is very important for the calculation of the disparity, which takes place after the determination of correspondence. It makes sense here to define the value of $u_e$ as the location of the maximum gradient of the intensity profile in a horizontal direction, something which corresponds to the zero point of the sigmoid function. This condition leads to $$u_e(u_c, v_c, t_c) = -p_3(v_c, t_c)/p_2(v_c, t_c), \quad (4)$$

$u_c$, $v_c$ and $t_c$ relating to the center of the observed local environment of the interest pixel. The value of $v_c$ furthermore denotes the epipolar line on which the relevant interest pixel lies.

In a step 7, the parameters of the parameterized function h(u, v, t) of interest pixels that are assigned to various individual images of the b-tuple and which lie on a common epipolar line are intercompared. The comparison is performed, for example, by using the smallest difference of the parameters as similarity measure.

In a step 8, the interest pixels of the various individual images of the b-tuple with the best similarity measure are determined as corresponding to one another. A three-dimensional reconstruction of the observed scene is subsequently performed in a known way on the basis of these corresponding interest pixels.

Figure 2:
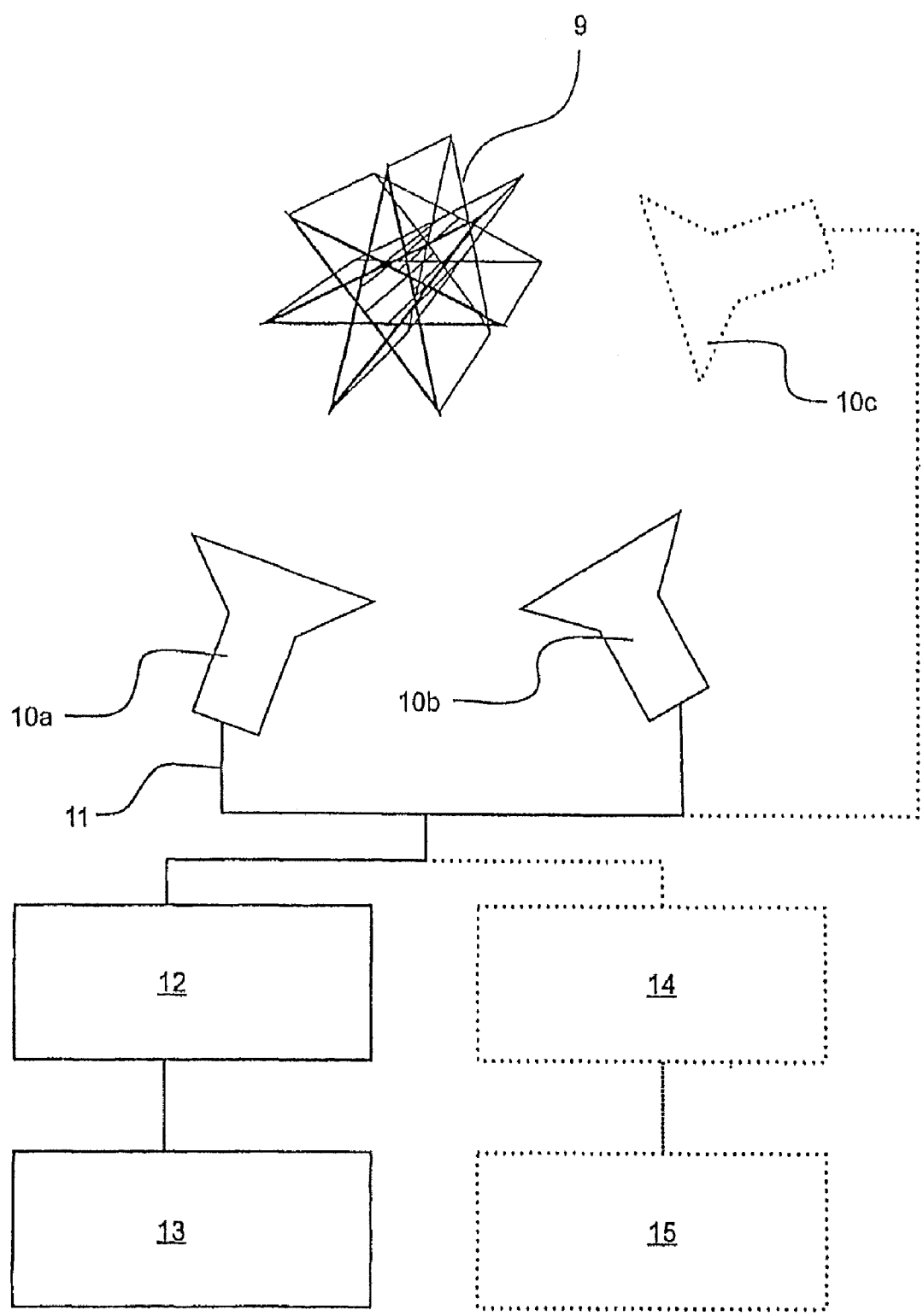
FIG. 2 shows an exemplary embodiment of device representing an embodiment of the new approach.

FIG. 2 shows a device for three-dimensional scene reconstruction. An object 9 is acquired optically by means of a camera system that consists of immobile cameras 10*a*, *b* and optionally 10*c*. The object 9 can be, for example, a stranger in a processing cell that is equipped with the device for three-dimensional scene reconstruction as robot protected area monitoring device. The cameras are designed as digital cameras, in particular as CCD cameras, by means of which images can be recorded in gray value format. In the case of other applications, it is also possible to use color cameras or thermal imaging cameras or UV cameras. The cameras 10*a*, *b*, *c* are synchronized with one another so that a tuple of three with three individual images is simultaneously recorded.

The camera signals are passed to a first evaluation unit 12 via a cable 111. The method, explained in conjunction with FIG. 1, for determining spatial correspondences is carried out in this evaluation unit 12. By way of example, an appropriate program is stored in an arithmetic logic unit for this purpose. The determined correspondences between the image areas of the image sequences of the cameras 10*a*, *b*, *c* are passed to a calculating unit 13 that reconstructs the acquired object 9 in three dimensions.

As indicated by dashes in FIG. 2, there is optionally provided a second evaluation unit 14 that likewise determines correspondences between image areas of the image sequences, but on the basis of an algorithm of different design. The evaluation unit 14 operates by means of a correlation analysis, for example. The correspondences determined in such a way are passed to a second calculating unit 15, which likewise reconstructs the acquired object 9 in three dimensions. The results of the first calculating unit 13 and the second calculating unit 15 can be mutually compared in order to obtain a higher reconstruction accuracy or can be evaluated independently of one another in order to achieve improved safety in the case of safety-relevant applications.

What is claimed is:

1. A method for three-dimensional reconstruction of a scene comprising at least one object, the method comprising the steps of:
   providing at least one camera for recording a plurality of images of the scene including the object,
   recording a first sequence of first images of the scene from a first perspective relative to the scene, and
   recording a second sequence of second images of the scene from a second perspective relative to the scene, the first and second perspectives being different from one another,
   determining a plurality of first image areas within the first images and determining a plurality of second image areas within the second images,
   identifying a plurality of correspondences between the first and second image areas, and
   reconstructing the scene based on the correspondences between the first and second image areas,
   wherein the correspondences are identified by matching a parameterized function to each image area in order to obtain a plurality of first and second function parameters representing the first and second image areas, and by comparing respective first and second function parameters,
   wherein the first and second sequences each comprise a plurality of first and second images so that a spatial position of the image areas and any movement over time of the image areas are used in order to identify the correspondences, and
   wherein the function parameters are determined by linear optimization using a computation path based on physically motivated simplifying assumptions.

2. The method of claim 1, wherein larger image regions which are relevant for identifying the correspondences are first determined within the first and second images, and the first and second image areas are determined from the larger image regions.

3. The method of claim 2, wherein the larger image regions have a variability in terms of image values, which variability exceeds a predefined threshold.

4. The method of claim 2, wherein a plurality of first and second difference images are determined by subtracting reference images from the plurality of first and second images, and wherein the larger image regions are determined from the first and second difference images.

5. The method of claim 2, wherein the larger image regions are determined by means of at least one of an interest operator designed as an edge filter, a local statistical gray value analysis, and a spatial temporal feature analysis.

6. The method of claim 1, wherein the first and second image areas are determined by applying at least one of a non-maximum suppression and a skeletonizing operation applied to the larger image regions.

7. The method of claim 1, wherein the image areas are determined such that each a first and a second image area are assigned to same epipolars.

8. The method of claim 1, wherein each image area comprises a number of interest pixels and a local environment thereof, and wherein the parameterized function is matched to the interest pixels and the local environment.

9. The method of claim 8, wherein the local environment is configured as a square pixel area.

10. The method of claim 1, wherein the image areas each are represented by a parameterized function depending on a pixel position (u, v), an image value g and time stamp t, with the parameterized function being configured as a hyperplane h(u, v, t) in a space R(uvgt).

11. The method of claim 10, wherein the hyperplane defines a normal vector representing an image area, and wherein an angle between normal vectors representing first and second image areas is used as a similarity measure for comparing the respective first and second function parameters.

12. A method for three-dimensional reconstruction of a scene comprising at least one object, the method comprising the steps of:
provide at least one camera for recording a plurality of images of the scene including the object,
recording a first sequence of first images of the scene from a first perspective relative to the scene, and
recording a second sequence of second images of the scene from a second perspective relative to the scene, the first and second perspectives being different from one another,
determining a plurality of first image areas within the first images and determining a plurality of second image areas within the second images,
identifying a plurality of correspondences between the first and second image areas, and
reconstructing the scene based on the correspondences between the first and second image areas,
wherein the correspondences are identified by matching a parameterized function to each image area in order to obtain a plurality of first and second function parameters representing the first and second image areas, and by comparing respective first and second function parameters,
wherein the first and second sequences each comprise a plurality of first and second images so that a spatial position of the image areas and any movement over time of the image areas are used in order to identify the correspondences, and
wherein a differential volume between surfaces determined from the first and second image areas is used as a similarity measure for comparing the respective first and second function parameters.

13. A method for three-dimensional reconstruction of a scene comprising at least one object, the method comprising the steps of:
providing at least one camera for recording a plurality of images of the scene including the object,
recording a first sequence of first images of the scene from a first perspective relative to the scene, and
recording a second sequence of second images of the scene from a second perspective relative to the scene, the first and second perspectives being different from one another,
determining a plurality of first image areas within the first images and determining a plurality of second image areas within the second images,
identifying a plurality of correspondences between the first and second image areas, and
reconstructing the scene based on the correspondences between the first and second image areas,
wherein the correspondences are identified by matching a parameterized function to each image area in order to obtain a plurality of first and second function parameters representing the first and second image areas, and by comparing respective first and second function parameters,
wherein the first and second sequences each comprise a plurality of first and second images so that a spatial position of the image areas and any movement over time of the image areas are used in order to identify the correspondences, and
wherein a Euclidian distance between function parameters representing first and second image areas is used as a similarity measure for comparing the respective first and second function parameters.

14. The method of claim 1, wherein the first and second sequence of images are simultaneously recorded by means of a plurality of cameras.

15. The method of claim 14, wherein the plurality of cameras comprises a first and a second camera forming a stereo camera system.

16. A device for three-dimensional reconstruction of a scene comprising at least one object, the device comprising at least one camera for recording a plurality of images of the scene including a first sequence of first images of the scene from a first perspective relative to the scene, and a second sequence of second images of the scene from a second perspective relative to the scene, the first and second perspectives being different from one another, comprising at least one evaluation unit for determining correspondences between the first and second images, and comprising at least one calculating unit for reconstructing the object, wherein the evaluation unit is configured for determining a plurality of first image areas within the first images and for determining a plurality of second image areas within the second images, the evaluation unit further being configured for identifying the plurality of correspondences between the first and second image areas, and wherein the calculating unit is configured for reconstructing the scene based on the correspondences between the first and second image areas, wherein the correspondences are identified by matching a parameterized function to each image area in order to obtain a plurality of first and second function parameters representing the first and second image areas, and by comparing respective first and second function parameters, wherein the first and second sequences each comprise a plurality of first and second images so that a spatial position of the image areas and any movement over time of the image areas are used in order to identify the correspondences, and
wherein the function parameters are determined by linear optimization using a computation path based on physically motivated simplifying assumptions.

17. The device of claim 16, further comprising a second evaluation unit configured for determining correspondences for a three-dimensional scene reconstruction on the basis of a correlation analysis.

* * * * *